(12) United States Patent
Miller et al.

(10) Patent No.: US 6,903,359 B2
(45) Date of Patent: Jun. 7, 2005

(54) METHOD AND APPARATUS FOR EDGE DETECTION

(75) Inventors: John P. Miller, Shelton, CT (US); Guoliang Shi, Suzhou (CN)

(73) Assignee: Pitney Bowes Inc., Stamford, CT (US)

( * ) Notice: Subject to any disclaimer, the term of this patent is extended or adjusted under 35 U.S.C. 154(b) by 278 days.

(21) Appl. No.: 10/251,586

(22) Filed: Sep. 20, 2002

(65) Prior Publication Data

US 2004/0056218 A1 Mar. 25, 2004

(51) Int. Cl.⁷ .............................................. G01N 21/86
(52) U.S. Cl. ............................ 250/559.36; 250/223 R; 53/381.7; 53/569
(58) Field of Search ..................... 700/220; 250/559.12, 250/559.36, 223 R; 53/460, 381.1, 381.3, 381.6, 558, 569, 564, 284.3, 570, 381.7

(56) References Cited

U.S. PATENT DOCUMENTS

| | | | |
|---|---|---|---|
| 4,782,238 A | * 11/1988 | Radl et al. ............. | 250/559.36 |
| 6,098,374 A | 8/2000 | Yates et al. ............. | 53/381.6 |
| 6,164,043 A | 12/2000 | Miller et al. ............. | 53/460 |
| 6,230,076 B1 | * 5/2001 | Miller .................... | 700/220 |
| 6,617,602 B2 | * 9/2003 | Kodama et al. ......... | 250/559.36 |

\* cited by examiner

Primary Examiner—Thanh X. Luu
Assistant Examiner—Stephen Yam
(74) Attorney, Agent, or Firm—Michael J. Cummings; Charles R. Malandra, Jr.; Angelo N. Chaclas

(57) ABSTRACT

An embodiment of the present invention comprises a method and apparatus of detecting edges. Light directed from any angle at a smooth surface will not cast a shadow regardless of the printing on the surface. Light cast at an appropriate angle on a stepped surface casts a shadow. The apparatus and method of the present invention cast light from several directions/sources while focusing on one location. If the same level of gray is detected from all sources, there is no shadow and hence the location is not an edge. If the result of one or more of the light sources is a darker image than the others, there is indication of an edge by the presence of a shadow. The use of edge detection in an insertion machine can help to decrease the amount of user adjustment needed to operate the machine using various sizes of envelopes.

20 Claims, 11 Drawing Sheets

METHOD AND APPARATUS FOR EDGE DETECTION

FIELD OF THE INVENTION

The invention disclosed herein relates generally to envelope throat detection and more particularly, method and apparatus for detecting an edge and determining the geometry or profile of an envelope throat.

BACKGROUND OF THE INVENTION

Typically, in an inserting machine for mass mailing, there is a gathering section where enclosure material is gathered before it is inserted into an envelope. This gathering section is sometimes referred to as a chassis subsystem, which includes a gathering transport with pusher fingers rigidly attached to a conveyor belt and a plurality of enclosure feeders mounted above the transport. If the enclosure material contains many documents, these documents must be separately fed from different enclosure feeders. After all the released documents are gathered, they are put into a stack to be inserted into an envelope in an inserting station. Envelopes are fed to the inserting station one at a time, and each envelope is placed on a platform facing down with its flap flipped back all the way.

An insertion system includes apparatus which positively opens envelopes and hold the envelopes open, thereby greatly reducing the amount of drag on the insert material and assuring that the insert material is reliably inserted into the waiting envelope. The waiting envelope is supported in a substantially horizontal plane with its back panel situated above its front panel and the envelope flap in its open position and substantially in the plane of the front panel. A pair of hold-down fingers presses the envelope flap from above against the inboard ends of respective pivotable paddles having an interior leg and an exterior leg angled out of the plane of the interior leg, to cause the flap to be bowed downwardly. This causes the rear panel to pop upwardly, thereby opening the envelope ready for an insert or insert collation to be inserted.

Typically, mechanical fingers or vacuum suction devices are used to keep the front side of the envelope on the platform while the throat on the back side of the envelope is pulled upward to open the envelope. The stack of enclosure material is than automatically inserted into the opened envelope. In this configuration the envelope fingers are fixed so as to be positioned to open only one size or type of envelope such as Number 10 business sized envelopes. Or alternatively, the fingers are adjustable by an operator. However, operator adjustment can be performed improperly and lead to jamming and improper opening. Additionally, operator adjustment is time consuming and most times needs to be performed each time an envelope size is changed.

Thus, one of the problems of the prior art is that a system is not available which can accurately identify the various envelope throat profiles and automatically adjust the envelope opening mechanism. Therefore, a system and method for detecting envelope throat profiles is needed which provides information to an inserting machine or other mail handling equipment for automated adjustment of envelope opening subsystem so as to accommodate opening of various sized envelopes.

SUMMARY OF THE INVENTION

This invention overcomes the disadvantages of the prior art by providing a method and apparatus for envelope throat detection. This in turn helps to reduce adjustment time, operator frustration, and jamming associated with improper opener adjustments. The present invention is directed to, in general, the apparatus and method of the present invention cast light from several directions/sources while focusing on one location. If the same level of gray is detected from all sources, there is no shadow and hence the location is not an edge. If the result of one or more of the light sources is a darker image than the others, there is indication of an edge by the presence of a shadow. The use of edge detection in an insertion machine can help to decrease the amount of user adjustment needed to operate the machine using various sizes of envelopes; and more particularly, an apparatus and method for detecting an edge.

In one embodiment the apparatus of the present invention comprises: first and second light sources, the first and second light sources directed at a first location on the first edge of the first plane, the first light source positioned at an angle capable of facilitating presence of a shadow indicating an edge when light is cast by the light source toward the first location on the first edge of the first plane, the second light source positioned at an angle capable of facilitating presence of light indicating an edge when light is cast by the light source toward the first location on the first edge of the first plane, and a detector for detecting the presence or absence of light on the second plane in a position adjacent to the first location on the first edge of the first plane; whereby light cast by the first light source is cast at different time than light cast by the second light source; and whereby light cast by the first light toward the first location on the first plane causes the shadow to be present adjacent to the first location on the first edge of the first plane and the shadow is detected by the detector, and light cast by the second light toward the first location on the first plane is present adjacent to the first location on the first edge of the first plane and is detected by the detector; and whereby the difference between the detected shadow and the detected light is an indication of the edge at the first location on the first plane.

In another embodiment the method of detecting a throat of an being fed along a feed path of a mail handling apparatus, comprising the steps of: a) Locating a leading edge of the envelope; b) Locating a trailing edge of the envelope; c) Opening the envelope flap; d) Locating a first side edge of the envelope; e) Locating a second side edge of the envelope; f) Determining the distance between the first and second side edges of the envelope and calculating half the distance between the first and second side edges of the envelope; g) Providing first and second light sources movably mounted along the feed path of the mail handling apparatus; h) Providing a sensing device movably mounted adjacent to the first and second light sources; I) Moving the sensing device and light sources adjacent to the calculated center of the envelope; j) Casting a first light at a location on the envelope throat; k) Detecting the presence or absence of light at a location adjacent to the location on the envelope throat; l) Casting second light at the location on the envelope throat; m) Detecting the presence or absence of light at the location adjacent to the location on the envelope throat; n) Moving the sensing device and light sources to a next location; 0) Repeating steps j)-n) until the throat profile for one-half the envelope has been determined; and p) Calculating the envelope throat profile using the measured one-half envelope throat profile.

An advantage of the method of the present invention is that it decreasing the need for operator adjustment of mail handling equipment. Other advantages of the invention will in part be obvious and will in part be apparent from the specification. The aforementioned advantages are illustrative of the advantages of the various embodiments of the present invention.

DESCRIPTION OF THE DRAWINGS

The above and other objects and advantages of the present invention will be apparent upon consideration of the following detailed description, taken in conjunction with accompanying drawings, in which like reference characters refer to like parts throughout, and in which.

DETAILED DESCRIPTION OF THE PRESENT INVENTION

Figure 1:
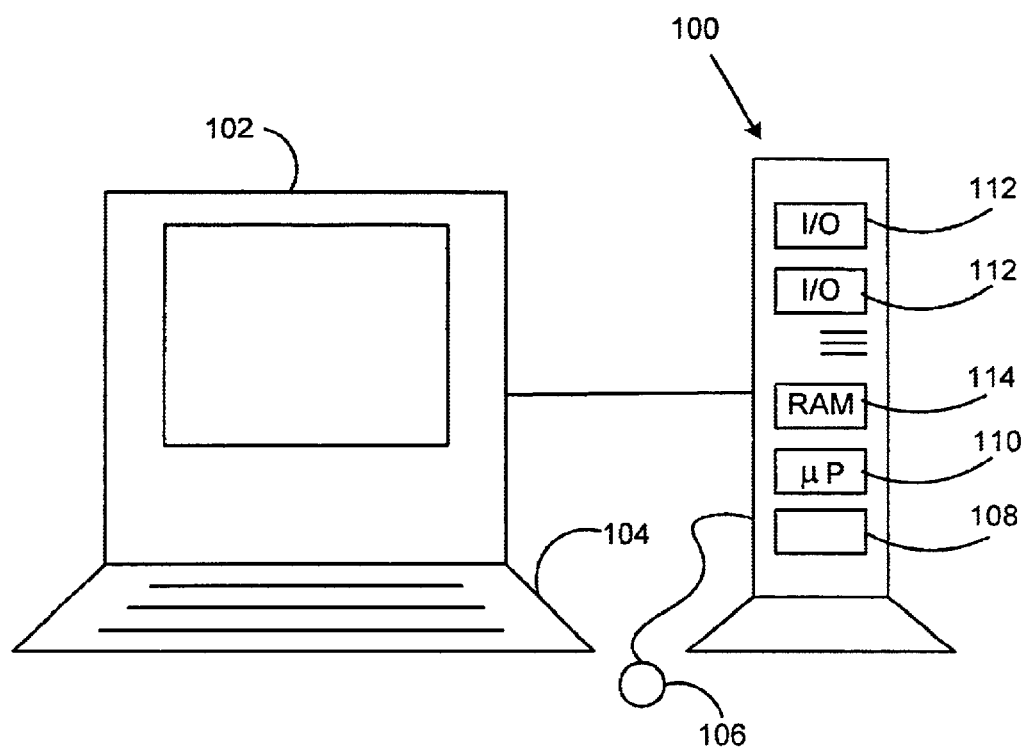
FIG. 1 is a block diagram that illustrates a computer system with which an embodiment of the invention may be controlled.

In describing the present invention, reference will be made herein to FIGS. 1–13 of the drawings in which like numerals refer to like features of the invention. Features of the invention are not necessarily shown to scale in the drawings.

Control Overview

FIG. 1 is a block diagram that illustrates a computer system 100, the use of which an embodiment of the invention may be implemented. Computer system 100 may be a personal computer which is used generically and refers to present and future microprocessing systems with at least one processor operatively coupled to user interface means, such as a display 102 and keyboard 104, and/or a cursor control, such as a mouse or a trackball 106, and storage media 108. The personal computer 100 may be a workstation that is accessible by more than one user. The personal computer also includes a conventional processor 110, such as a Pentium® microprocessor manufactured by Intel, and conventional memory devices such as hard drive 108, floppy or CDRW drive(s) 112, and memory 114.

Figure 2:
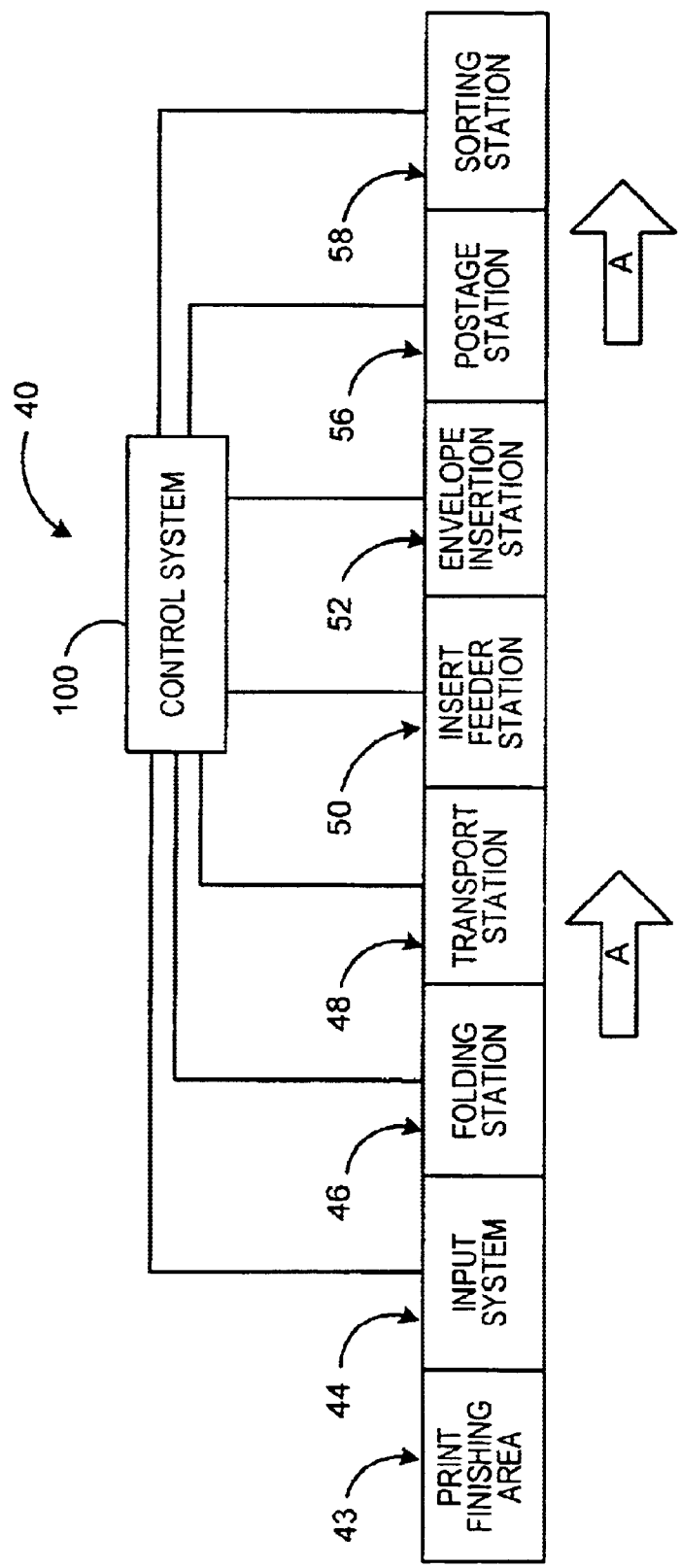
FIG. 2 is a block diagram schematic of a typical document inserting system.
Figure 3:
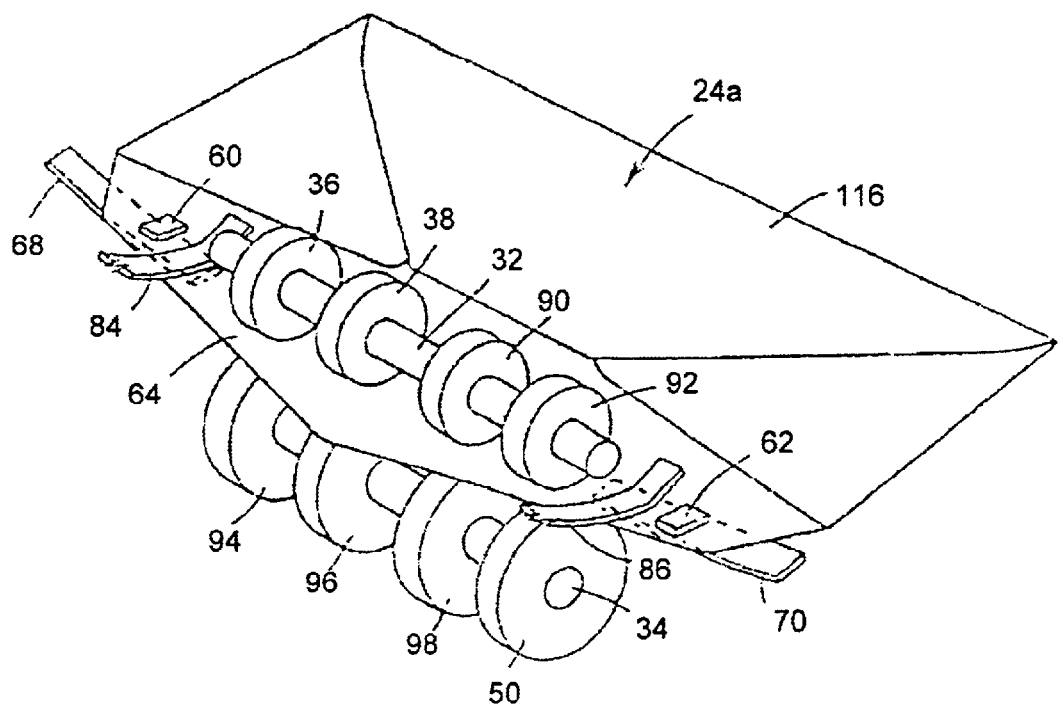
FIG. 3 is a perspective view of the envelope opening apparatus showing opening horns about to enter the envelope.
Figure 4:
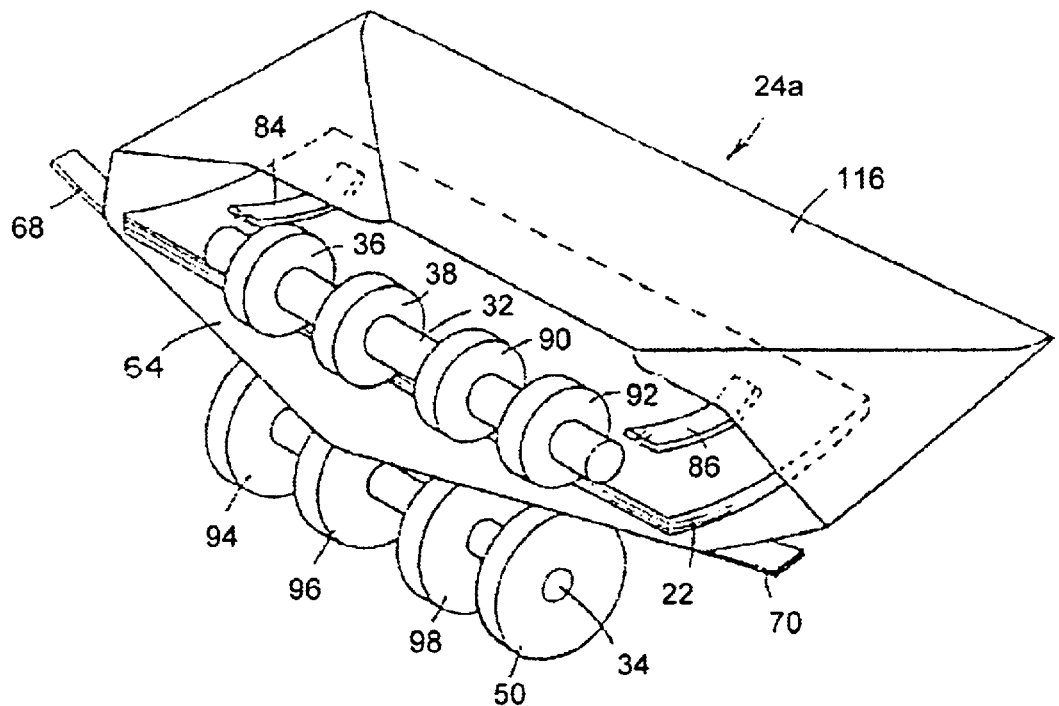
FIG. 4 is similar to FIG. 3 but shows the opening horns fully engaging the envelope and enclosure documents being inserted into the envelope.

The computer system 100 can be connected to a inserting apparatus as illustrated in FIG. 2. The control system 100 of the inserter system 40 may be the microprocessor based personal computer system 100 described above. The computer system 100 includes appropriate memory devices 108, 114 for storage of information such as an address database 22. One of ordinary skill in the art would be familiar with the general components of the inserter system with which the present invention may be implemented.

Document Inserting System Overview

The edge detection apparatus of the present invention may be part of a document inserting system 40. FIG. 2 is a schematic of a typical document inserting system, generally designated 40. In the following description, numerous paper handling stations implemented in inserter system 40 are set forth to provide a thorough understanding of the operating environment of the inserter. However it will become apparent to one skilled in the art that the present invention may be practiced without the specific details of these paper-handling stations.

As will be described in greater detail below, system 40 preferably includes an input system 44 that feeds paper sheets from a paper web or individual sheets (not shown) to an accumulating station that accumulates the sheets of paper in collation packets (not shown). In this particular example, the apparatus of the present invention provides envelope throat profile information to the control system 100 of inserter system 40 to control the opening of various sized envelopes in the mailing inserter system 40. Alternate methods of inserting include printing the address on the insert document only and inserting such document into a window envelope which reveals the address, printing the documents in a print finishing 43 area upstream from the input system 44 of document inserting system 40 and feeding the documents directly to the input system 40 from the print finishing area 43.

Typically input system 44 feeds sheets in a paper path, as indicated by arrow A along a deck is commonly called the main deck (not shown) of inserter system 40. After sheets are accumulated into collations by input system 44, the collations are folded in folding station 46 and the folded collations are then conveyed to a transport station 48, preferably operative to perform buffering operations for maintaining a proper timing scheme for the processing of documents in inserting system 40.

Each sheet collation is fed from transport station 48 to insert feeder station 50. It is to be appreciated that a typical inserter system 40 includes a plurality of feeder stations, but for clarity of illustration only a single insert feeder 50 is shown. Insert feeder station 50 is operational to convey an insert (e.g., an advertisement) from a supply tray to the main deck of inserter system 40 so as to be nested with the aforesaid sheet collation being conveyed along the main deck. The sheet collation, along with the nested insert(s) are next conveyed into an envelope insertion station 52 that is operative to insert the collation into an envelope. The envelope is conveyed to the postage station 56 where appropriate postage is applied thereto. Finally, the envelope is conveyed to sorting station 58 that sorts the envelopes in accordance with postal discount requirements.

The use of the document inserting system 40, such as, for example, a Series 9 Inserter Systems manufactured by Pitney Bowes Inc. of Stamford, Conn., is well known. Such document inserting systems are used by organizations (e.g., banking institutions, utility companies, insurance companies, credit companies, and the like) for assembling large amounts of outgoing mailpieces for dispatch through the postal system. Typically, such organizations create documents, such as billing documents, in a computer such as a mainframe computer system (not shown) that is separate from the document inserting system 40 that will process the documents into such mailpieces.

Envelope Opening Apparatus

With the general structure of inserter system 40 described above, a more specific description will now be given regarding a typical envelope insertion station 52. The description details an embodiment that uses fingers and flippers to facilitate opening the envelope throat. However, the embodiment is not meant to limit the use of the edge detection method and apparatus of the present invention.

FIG. 2 depicts a typical inserting system 40 including the envelope inserting station 52 for inserting paper documents 22 into a waiting envelope 24a having its front panel 118 underneath, its back panel 116 uppermost, and its flap 64 open, upwardly facing and in a trailing position. The envelope inserting station 52 also includes an upper shaft 32 and a vertically translatable lower drive shaft 34. The upper shaft 32 supports four, spaced feed rollers 36, 38, 90 and 92 rotatably secured thereto while the lower shaft 34 supports four spaced, cooperating drive rollers 94, 96, 98 and 50 respectively fixedly secured to the drive shaft 34. The shaft 34 is mounted in such manner that the drive rollers 94, 96, 98 and 50 can be raised and lowered selectively.

A pair of pivotable hold-down fingers 60 and 62 are situated between the shafts 32 and 34 and above the envelope flap and function to press down on the envelope flap 64 and open the mouth of the envelope. Situated beneath the hold-down fingers 60 and 62 are a pair of flippers 68 and 70 which cooperate with the fingers 60 and 62 respectively to effect the opening of the mouth of the envelope 24a.

The paper documents 22 which are to 5 are to be inserted into the waiting envelope 24a are fed by upstream feed apparatus (not shown), such as folding rollers along a chute 72 toward a pair of insert feed rollers (not shown) which continue to feed the documents 22 through the opening between the upper rollers 36, 38, 90 and 92 and the lower rollers 94, 96, 98 and 50, which latter are lowered at this time. The momentum given the documents 22 by the feed rollers 36, 38, 90 and 92, due to a leaf spring (not shown) urging the documents from below against these feed rollers, conveys the documents 22 into the waiting envelope 24a.

The operation of the insertion station 20 will now be described. The envelope feed rollers (not shown) cooperate to feed an envelope from the position occupied by envelope 24b to the position occupied by envelope 24a against the envelope stop (not shown) in the down position. The drive rollers 94, 96, 98 and 50 are lowered from the feed rollers 36, 38, 90 and 92 respectively, just before the envelope strikes the stop 54. The hold-down fingers 60 and 62 are in a raised position to allow the envelope to pass thereunder, and the flippers 68 and 70 are in a position where their interior ends respectively are raised. The waiting envelope at the insertion station is supported in a substantially horizontal orientation on the upper surface of conveyor (not shown).

Figure 6:
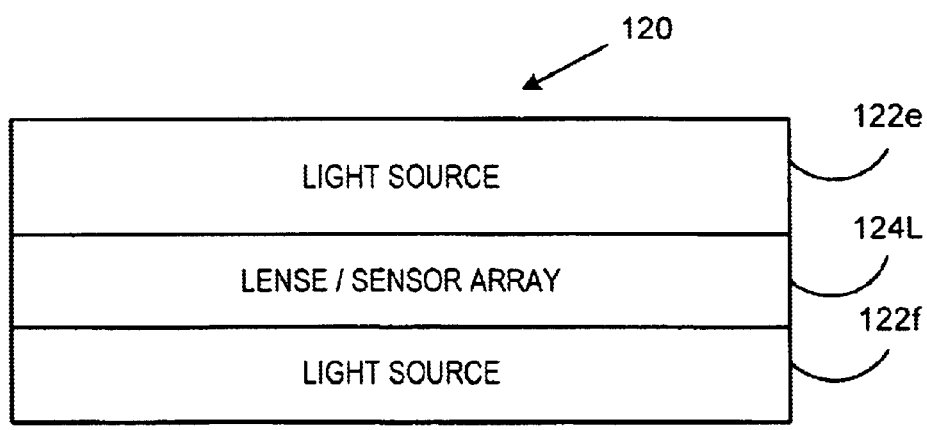
FIG. 6 illustrates another configuration of the edge detection apparatus of the present invention.
Figure 11:
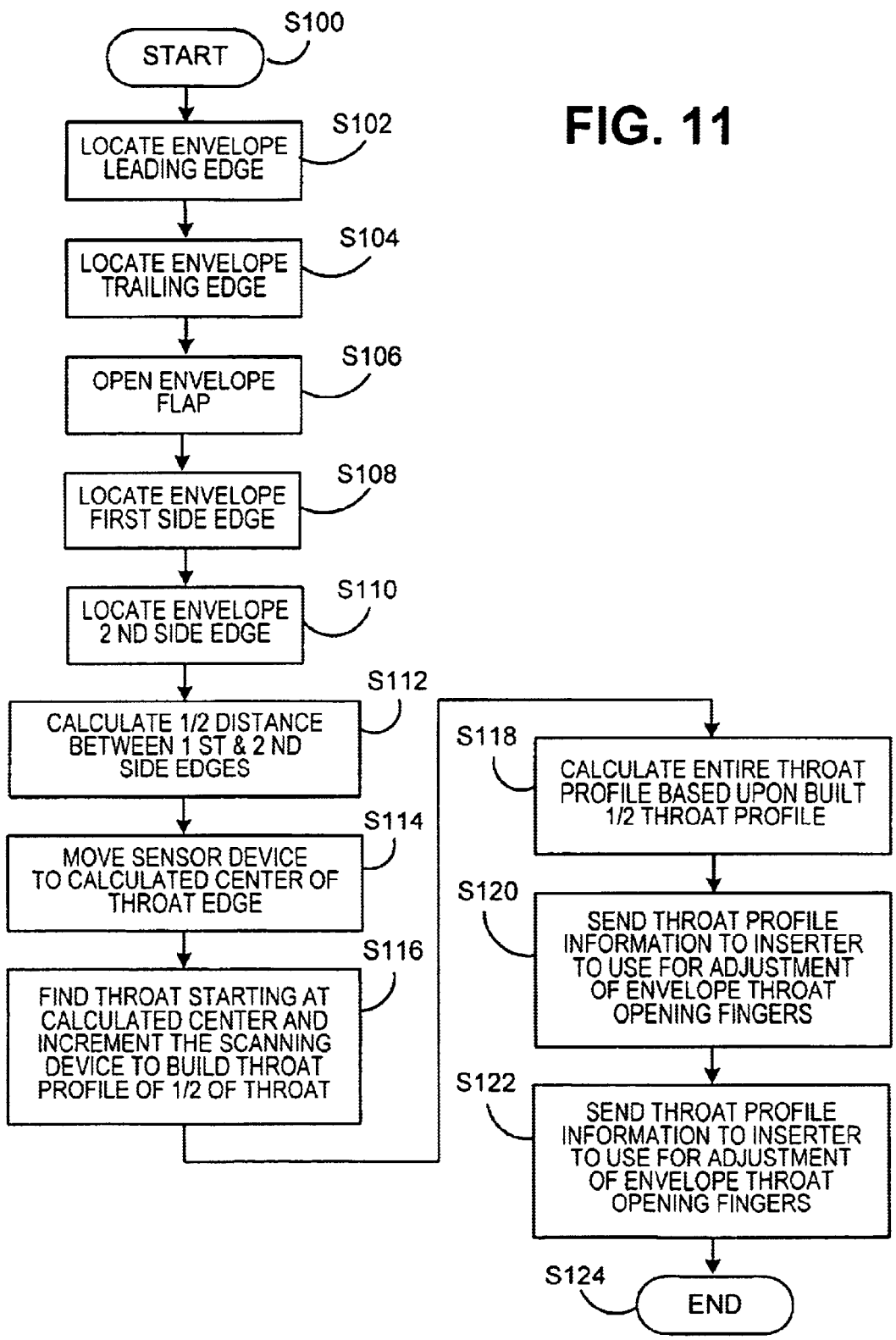
FIG. 11 is a flow chart of an embodiment of the method of the present invention.
Figure 12:
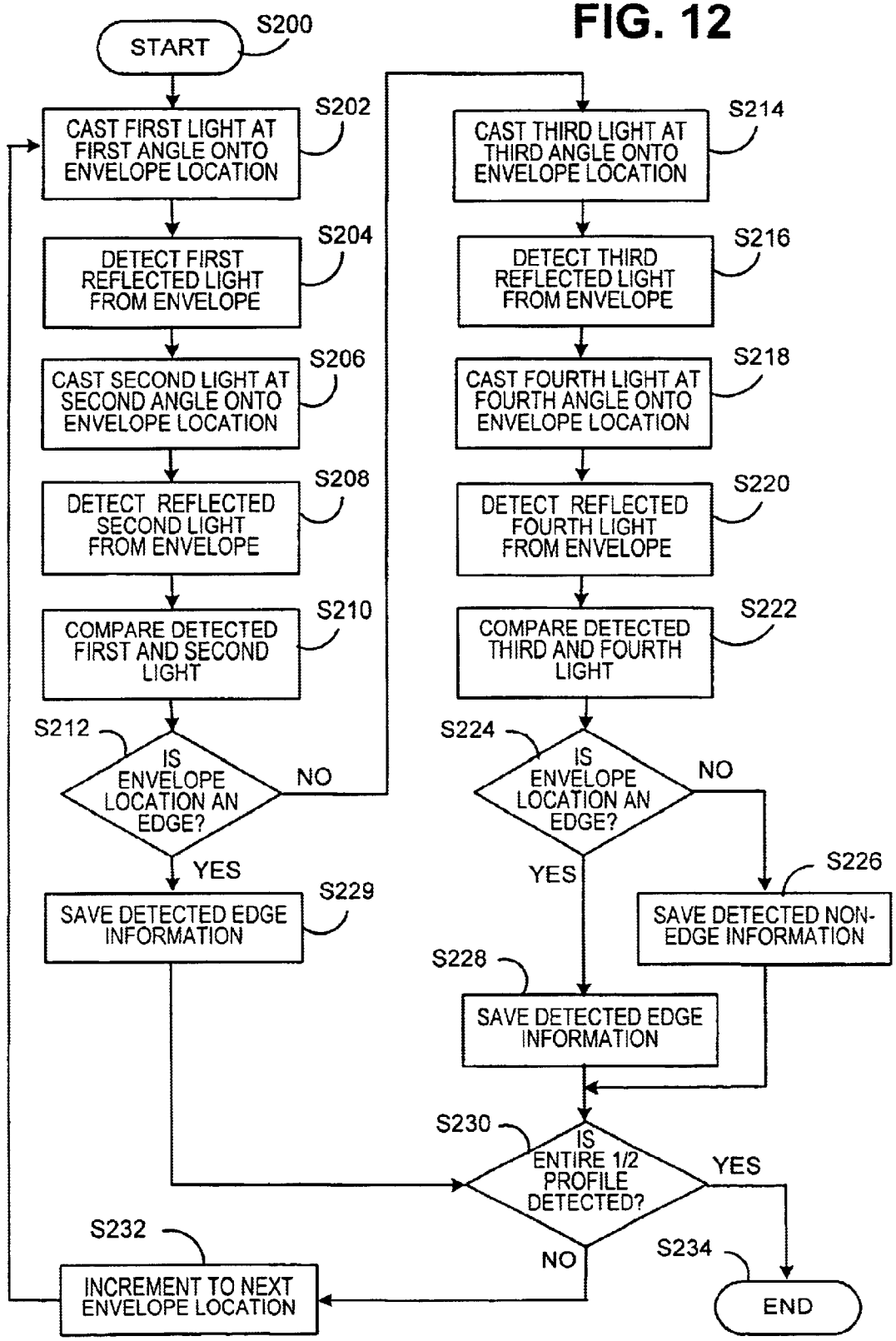
FIG. 12 is a flow chart further detailing of the step of envelope throat profile detection for an embodiment of the method of the present invention.

Once the envelope has reached the position of the envelope 24a, the hold-down fingers 60 and 62 are rotated downward to the positions seen in FIGS. 6, 11 and 12 against the flippers 68 and 70 respectively, which are thereby caused to pivot against the bias of their torsion springs and pucker the envelope 24a, i.e. the envelope front panel 118 (address bearing panel) is separated from the back panel 116. In this way, the flap 64 is forced downward and the envelope 24a is puckered, causing it to open.

Optical Scanner Technology Overview

Typical optical scanner technology includes the use of charge-coupled devices (CCDs) which can detect variations in light intensity and frequency. Other scanning technology includes drums scanners which rely on photomultiplier tube (PMT) technology. The more densely packed the CCDs are the better the resolution of the scanner. Flat bed scanners can include a linear array of CCDs in a bar configuration. The bar which also includes one or more light sources is moved across the material. Light is cast onto the material by the light source(s) and detected by the CCDs. The light sources typically are light emitting diodes (LEDs).

Edge Detection Apparatus of the Present Invention

Figure 5:
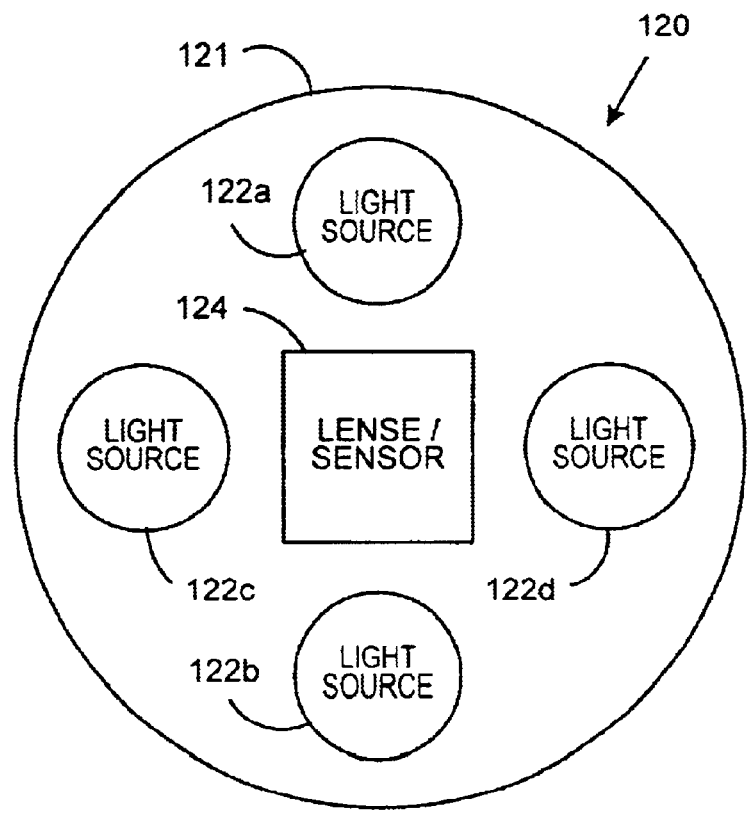
FIG. 5 illustrates a configuration of the edge detection apparatus of the present invention.

FIGS. 5 and 6 illustrate two configurations of the edge detection apparatus 120 of the present invention. However, these configurations as shown for exemplary purposes and are not meant to limit the apparatus and method of the present invention. Other configurations with various numbers of lights sources and sensors may be used. FIG. 5 illustrates the preferred embodiment of the present invention. In the preferred embodiment a housing 121 provides structure on which to mount multiple light sources (preferably LEDs) 122a, 122b, 122c and 122d. A sensor 124 (the term sensor may be used interchangeably with the terms lens or detector and is preferably a CCD) is mounted between the LEDs 122a–d. FIG. 6 illustrates a bar type configuration such as one used in a flat bed scanner. A linear array of lenses or sensors (preferably CCDs) 124L is placed between two linear arras of light sources (preferably LEDs) 122e and 122f. While the Figures do not show the edge detection apparatus connected to control system, it is to be understood that the edge detection apparatus would be interconnected to a control system, such as control system 100 of FIGS. 1 and 2, that would be in communication with the envelope insertion station 50. The theory supporting the operation of the present invention is that light directed from any angle at a smooth surface will not cast a shadow regardless of the printing on the surface. Light cast at an appropriate angle on a stepped surface casts a shadow. The apparatus and method of the present invention cast light from several directions/sources while focusing on one location i.e. spot. If the same level of gray is detected from all sources, there is no shadow and hence the location is not an edge. If the result of one or more of the light sources is a darker image than the others, there is indication of an edge by the generation of a shadow.

Preferably, the angle of the LEDs is 45 degrees to, for example, a horizontal plane. However, the angle of the LEDs could be a different angle and is a function of width or narrowness of the sensor's viewing area. The width of the shadow should be a significant amount of the viewing area of the sensor, and at 45 degrees, the shadow is only as wide as the top sheet is thick. Both the single point sensor 124 (as shown in FIG. 5) and the sensor array 124*l* (as shown in FIG. 6) configurations use lenses, such as for example SELFOC® Lens Array (SLA) manufactured by NSG Incorporated American of Somerset, N.J., that limit the diameter of the viewing area to about 0.012". A shallower angle between the sensor and the paper could be used to cast a longer (or wider) shadow. However, this could cause difficulty in sensing the reflection if the sheet or paper has a different reflectivity when viewed from different directions.

Figure 7A:
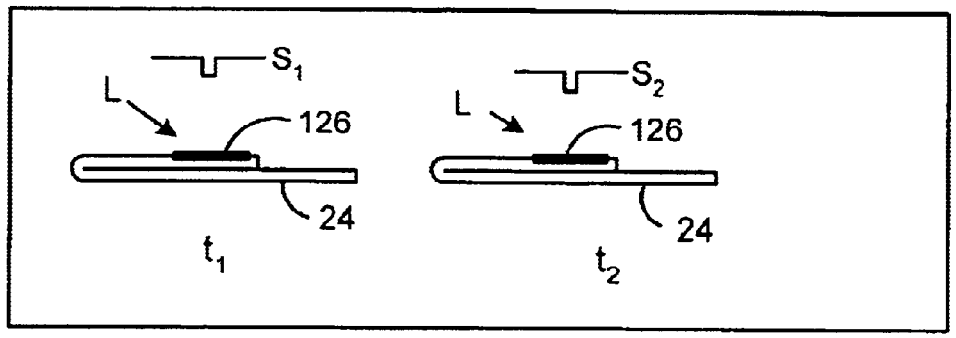
FIG. 7a illustrates the detection of a dark spot such as an ink spot on envelope 24.
Figure 7B:
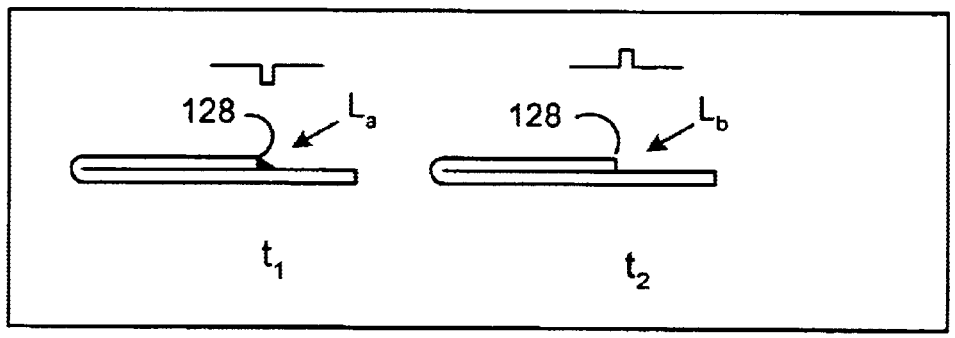
FIG. 7b illustrates the detection of an edge such as a portion of the throat of envelope 24.

The basic operational of the edge detection apparatus is illustrated by the examples in FIGS. 7*a*–*b*. FIG. 7*a* illustrates the detection of a dark spot such as an ink spot on envelope 24. FIG. 7b illustrates the detection of an edge such as a portion of the throat of envelope 24.

In FIG. 7a at time $t_1$ light, illustrated by arrow $L_a$ is cast by light source 122a (of FIG. 5) onto ink spot 126. The sensor 124 (shown in FIG. 5) detects the presence of the ink spot (depicted by the signal $S_1$ shown above the $t_1$ illustration. In FIG. 7a at time $t_1$ light, illustrated by arrow $L_a$ is cast onto ink spot 126. Next at time $t_2$ light, illustrated by arrow $L_b$ is cast by light source 122b (of FIG. 5) onto ink spot 126. The sensor 124 (shown in FIG. 5) detects the presence of the ink spot (depicted by signal $S_2$ shown above the $t_2$ illustration. The control system 100 processes the signals received at times $t_1$ and $t_2$ by, for example, subtracting the signals ($t_1-t_2$) resulting in approximately a zero sum. The zero sum indicates that the spot onto which the light is cast is an ink spot or the like.

In FIG. 7b at time $t_1$ light, illustrated by arrow $L_a$ is cast by light source 122a (of FIG. 5) onto edge 128. The sensor 124 (shown in FIG. 5) detects the presence of the edge (depicted by signal $S_1$ shown above the $t_1$ illustration. In FIG. 7a at time $t_1$ light, illustrated by arrow $L_a$, light is cast onto edge 128. The sensor 124 (shown in FIG. 5) detects the presence of the a shadow (depicted by signal $S_1$ shown above the $t_1$ illustration. Next at time $t_2$ light, illustrated by arrow $L_b$, light is cast by light source 122b (of FIG. 5) onto edge 128. The sensor 124 (shown in FIG. 5) detects the absence of a shadow (depicted by signal $S_2$ shown above the $t_2$ illustration. The control system processes the signals received at times $t_1$ and $t_2$ by, for example, subtracting the signals ($t_1-t_2$) resulting in a non-zero sum. The non-zero sum indicates that the place 128 onto which the light is cast is an edge since the edge casts a shadow when the light is cast from a first source at a first angle and no shadow is cast when the light is cast from a second source at a second angle. The angle at which the light is cast can be determined by one of ordinary skill in the art.

Figure 8:
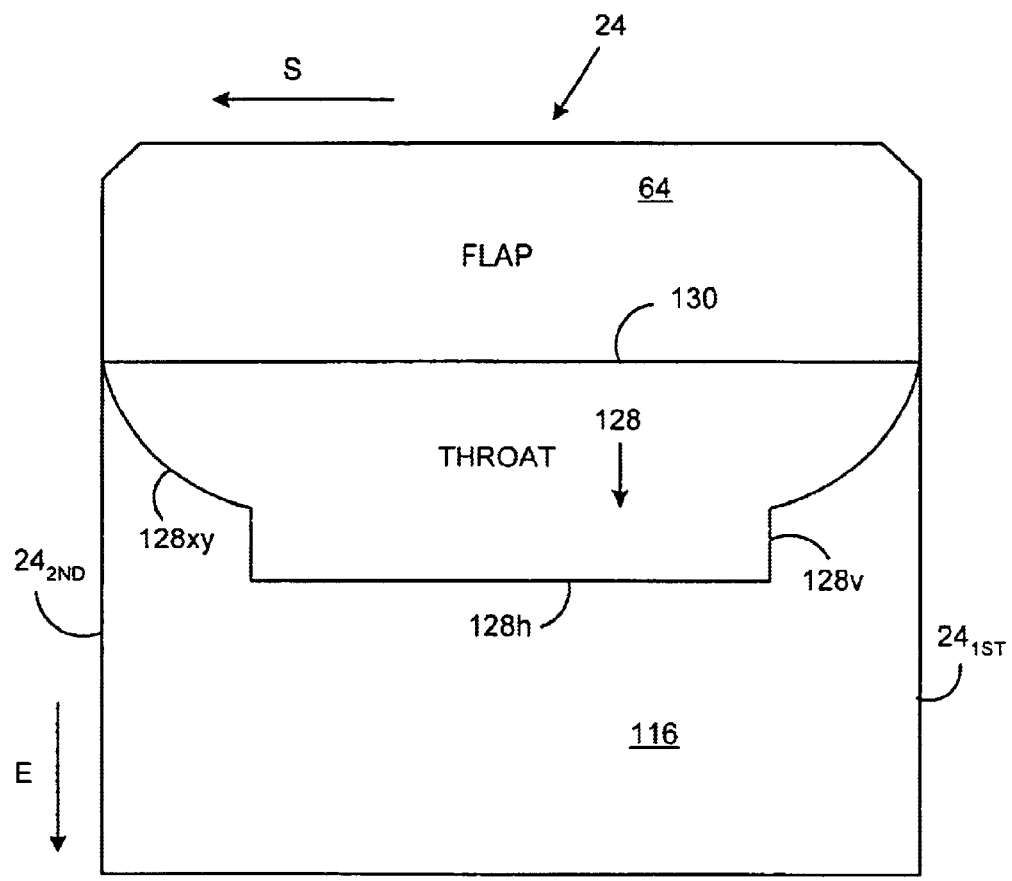
FIG. 8 illustrates an exemplary envelope with a flap and a throat profile.
Figure 9A:
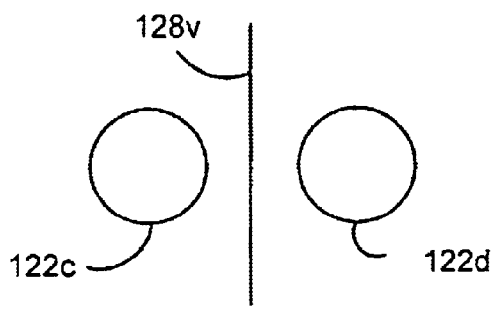
FIGS. 9a–c illustrate each the position of light sources relative to an area to be detected.
Figure 9B:
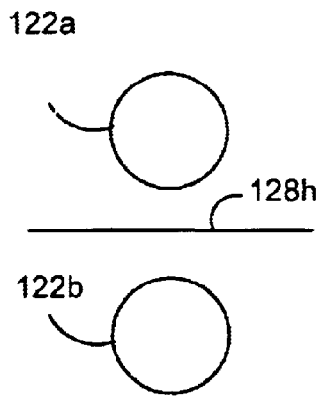
Figure 9C:
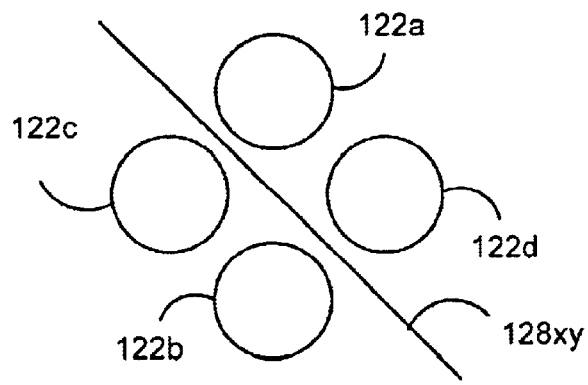
Figure 9D:
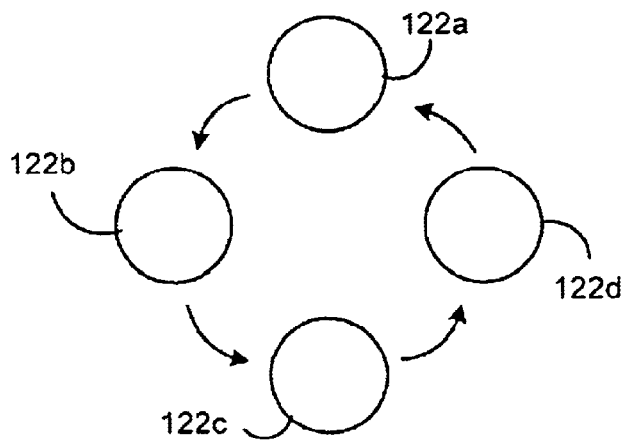

FIG. 8 illustrates an exemplary envelope 24 with first side edge $24_{1ST}$, second side edge $24_{2ND}$, flap 64 and throat profile 128. The throat profile has a vertical edge 128v, horizontal edge 128h and angled edge 128xy. Crease 130 is created when the flap 64 is folded over the throat 128. FIG. 8 also illustrates arrow S which is a preferred direction for movement of the sensor along the envelope throat and arrow E which is a preferred direction for movement of the envelope along the feed path of, for example, an inserter system. Portions of FIG. 8 are referenced in the description of FIGS. 9a–c. FIGS. 9a–c each illustrate the position of light sources (of the embodiment of FIG. 5) relative to an area to be detected. FIG. 9a illustrates light sources 122c and 122d positioned on either side of vertical edge 128v of the envelope throat 128. FIG. 9b illustrates light sources 122a and 122b positioned on either side of horizontal edge 128h of the envelope throat 128. FIG. 9c illustrates light sources 122a,d and 122b,c positioned on either side of angled edge 128xy of the envelope throat 128. FIG. 9d illustrates the serial detection performed on an angled edge such as edge 128xy of FIG. 9c. Each light source 122a–d are operated sequentially to cast light onto edge 128xy and determine the profile of the edge. Buffers can be used to store data indicative of the result of the light cast by each LED 122a–d.

Edge Detection Using Linear Array

Figure 10:
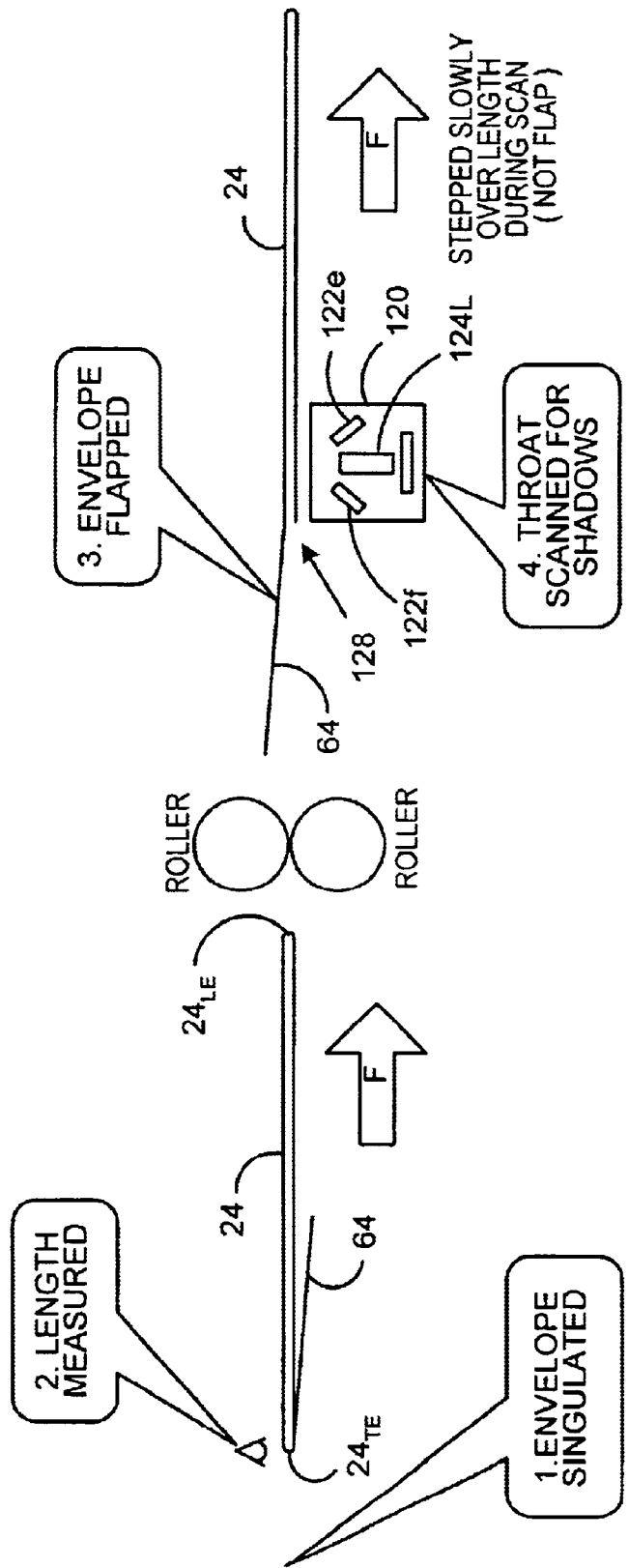
FIG. 10 illustrates the movement of an envelope through an insertion apparatus such as the inserter system of FIG. 2, and the detection of the envelope throat profile using an embodiment of the apparatus of the present invention.

The embodiment of FIG. 6 depicts a linear array of lenses or sensors (preferably CCDs) 124L placed between two linear arrays of light sources (preferably LEDs) 122e and 122f. FIG. 10 illustrates the movement of an envelope through an insertion apparatus such as the inserter system 40 of FIG. 2, and the detection of the envelope throat profile using an embodiment of the apparatus 120 of the present invention. Arrows F indicate the direction of movement of envelope 24. As is shown in FIG. 6, the envelope is singulated upstream of the scanning area and the length of the envelope is measured. The envelope is flapped (flap is opened) and the throat is scanned using the apparatus 120 of the present invention to determine the throat profile. The scanner is slowly stepped over the length of the envelope (not including the flap) to determine the throat profile.

Method of Edge Detection of the Present Invention

FIG. 11 is a flow chart of an embodiment of the method of the present invention. The method of edge detection may be performed using the apparatus illustrated in FIGS. 2 and 5. Turning to FIG. 11, at step S100 the method begins. At step S102 the inserting system 40 locates the leading edge $24_{LE}$ of envelope 24 (leading edge illustrated in FIG. 10). At step S104 the trailing edge $24_{TE}$ of envelope 24 is located by inserting system 40. At step S106 the envelope 24 is flapped (that is the flap 64 of the envelope 24 is unfolded similarly to step 3 of FIG. 10). At step S108 the envelope 24 first side edge $24_{1ST}$ is located and at step S110 the envelope 24 second side edge $24_{2ND}$ is located. At step S112 the distance between the first and second side edges is calculated. The calculation results in the location of approximately the center of the envelope throat 128. Next at step S114 the apparatus 120 of the present invention is moved to a location adjacent to the calculated center of the envelope throat 128. The edge detection apparatus can be mounted on a carriage (not shown) and moved using a stepper motor (not shown) and control commands from controller 100. One of ordinary skill in the art would be able to perform motion control of the sensor apparatus 120 and therefore the details of the motion control are not discussed herein so as not to obscure aspects of the present invention. Returning to the flow chart of FIG. 11, at step S116 the apparatus 120 is incremented along one-half of the envelope throat and operated to detect the throat profile. The details of step S116 will be further elaborated upon in the description of the flow chart of FIG. 12 set forth below. At step S118, the throat profile is calculated for envelope throat 128 using the data collected in step S116 for one-half the throat profile. At step S120 the throat profile information is sent to the inserter and used to adjust envelope throat opening fingers such exemplary fingers 84 and 86 shown in FIGS. 3 and 4. At step S124 the method ends.

As was mentioned in the description of FIG. 11, FIG. 12 is a flow chart further detailing of the step of envelope throat profile detection for an embodiment of the method of the present invention. The method is performed using the apparatus 120 of FIG. 5 and the inserting system 40 of FIG. 2. The method is described for illustration purposes and is not meant to be limited to this embodiment. At step S200 the method begins. At step S202 light is cast from the first light 122a at a first angle onto a location on the envelope. At step S204 the reflection of the first cast light is detected by sensor 124. At step S206 light is cast from the second light 122b at a second angle onto the location on the envelope. At step S208 the reflection of the second cast light is detected by sensor 124. At step S210 the detected reflection of the first and second cast lights are compared. At step S212 a query is made as to whether the location on the envelope is an edge. Preferably, the analysis performed in this query uses the compared information from step S210. If the answer to the query of step S212 is no, then at step S214 light is cast from a third light 122c at a third angle onto the location on the envelope. At step S216 the reflection of the third cast light is detected by sensor 124. At step S218 light is cast from the fourth light 122d at a fourth angle onto the location on the envelope. At step S220 the reflection of the fourth cast light is detected by sensor 124. At step S222 the detected reflections of the third and fourth cast lights are compared. At step S224 a query is made as to whether the location on the envelope is an edge 128. Preferably, the analysis performed for the query uses the compared information from step S222. If the answer to the query of step S224 is no, then at step S226 the detected non-edge information is saved. If the answer to the query of step S224 is yes, then the detected edge information is saved. Following step S226 or step S228 is step S230 where a query is made as to whether the one-half throat profile has been detected.

Returning to the query of step S212, if the answer to the query is yes, that an edge has been detected, then at step S229 the edge information is saved. Step S230 follows step S229. As mentioned above, step S30 is a query as to whether the one-half throat profile has been detected. If the answer to the query is no, then at step S232 the apparatus of the present invention is incremented to read the next location on the envelope. Next, steps S202 through S230 are repeated until the one0half profile is detected and the answer to the query of step S230 is yes. Then at step S234 the method ends.

Figure 13:
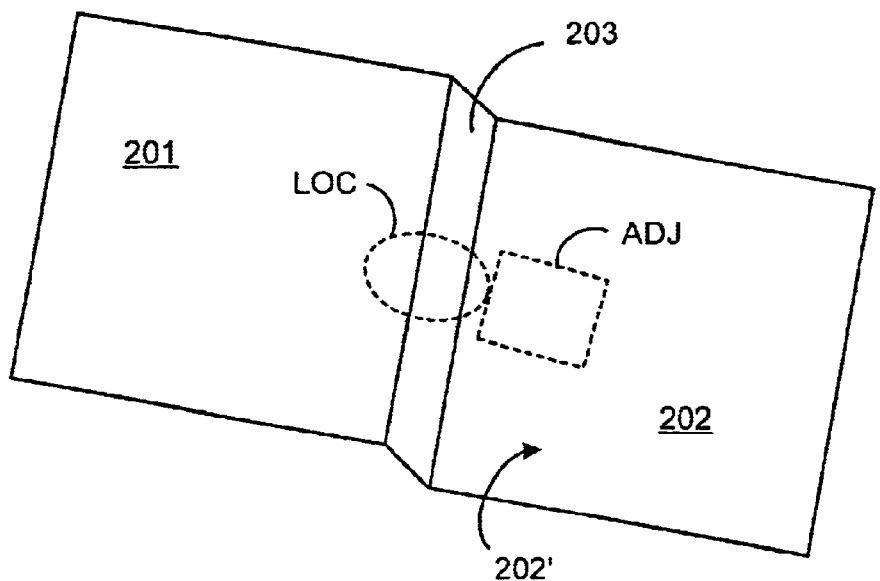
FIG. 13 is a perspective view of a first plane laying on a second plane with an edge of the first plane adjacent to the first side of the first plane.

While the present invention is preferably used to identify envelope throat profiles, the invention could be adapted to detect of multiple items in a transport where single items are preferred. The ability to distinguish edges from print enables this present invention to detect a leading edge of a multiple item. FIG. 13 is a perspective view of a first plane 201 laying on a second plane 202 with an edge 203 of the first plane 201 adjacent to the first side 202' of the second plane. 202. The location LOC is identified as a portion of the edge (and denoted approximately with dotted lines) toward which light will be cast by various sources. The location ADJ is adjacent to location LOC and is the area at which the detector will detect the presence or absence of light.

The embodiments described herein can provide the advantages by decreasing the need for operator adjustment of mail handling equipment. While the present invention has been disclosed and described with reference to a various embodiments thereof, it will be apparent, as noted above that variations and modifications may be made therein. It is, thus, intended in the following claims to cover each variation and modification that falls within the true spirit and scope of the present invention.

What is claimed is:

1. A method of detecting a throat of an envelope, the envelope being fed along a feed path of a mail handling apparatus, the method comprising the steps of:
    a) Locating a leading edge of the envelope;
    b) Locating a trailing edge of the envelope;
    c) Opening the envelope flap;
    d) Locating a first side edge of the envelope;
    e) Locating a second side edge of the envelope;
    f) Determining the distance between the first and second side edges of the envelope and calculating half the distance between the first and second side edges of the envelope;
    g) Providing first and second light sources movably mounted along the feed path of the mail handling apparatus;
    h) Providing a sensing device movably mounted adjacent to the first and second light sources;
    i) Moving the sensing device and light sources adjacent to the calculated center of the envelope;
    j) Casting a first light at a location on the envelope throat;
    k) Detecting the presence or absence of light at a location adjacent to the location on the envelope throat;
    l) Casting a second light at the location on the envelope throat;
    m) Detecting the presence or absence of light at the location adjacent to the location on the envelope throat;
    n) Moving the sensing device and light sources to a next location;
    o) Repeating steps j)–n) until the throat profile for one-half the envelope has been determined;
    p) Calculating the envelope throat profile using the measured one-half envelope throat profile.

2. The method as claimed in claim 1, further comprising:
    q) Providing the envelope throat profile calculation to an inserter apparatus;
    r) Adjusting a finger in the inserter apparatus based upon the envelope throat profile calculation.

3. An apparatus for detecting a profile of an edge of a first sheet overlapping on top of a second sheet, the apparatus comprising:
    a sensor arrangement comprising:
        a first angled light source operable to cast light at a spot on a plane of the first and second sheets positioned below,
        a second angled light source operable to cast light at the spot on the plane of the first and second sheets positioned below, the second angled light source positioned opposite the first angled light source, and
        a light detector positioned between the first and second angled light sources operative to detect the presence or absence of light at the spot;
    a sensor positioning carnage supporting the sensor arrangement, and movable in a plane over the plane of the first and second sheets;
    a controller controlling the sensor arrangement and sensor positioning carriage in a predetermined manner to test a plurality of spots on the plane of the first and second sheets in order to determine which spots include the edge and to determine the profile of the edge based on locations of the spots detected to include the edge;
    wherein the controller tests spots for the edge by sequentially illuminating a given spot with the first or second angled light sources, detecting the presence or absence of light at the given spot during intervals while the each of the light sources are separately illuminated, and determining that an edge is present if there is a difference between light detected at the spot while the first or second sources are illuminated, and, upon detecting the presence or absence of the edge at the given spot, storing the locations of spots that include the edge and moving the sensor positioning carnage to a new spot to determine whether that spot includes the edge.

4. The apparatus of claim 3 wherein the first and second light sources are arranged along an X axis in the plane above the first and second sheets and wherein the opposing first and second light sources are used to detect whether the given spot includes an edge having a directional component in a Y axis, perpendicular to the X axis.

5. The apparatus of claim 4 wherein the sensor arrangement further comprises third and fourth angled light sources operable to cast light at the spot on the plane of the first and second sheets positioned below, the third and fourth angled light sources being positioned opposite each other along the Y axis with the light detector in between, wherein the opposing third and fourth light sources are used to detect whether the given spot includes an edge having a directional component in a X axis.

6. The apparatus of claim 5 wherein the controller further tests spots for the edge by sequentially illuminating a given spot with the third and fourth angled light sources, detecting the presence or absence of light at the given spot while the third and fourth light sources are separately illuminated, and determining that an edge is present if there is a difference between light detected at the spot during intervals while the third or fourth sources are illuminated.

7. The apparatus of claim 5 wherein the controller further tests spots for a diagonal component of the edge by sequentially illuminating a given spot with the combined first and third sources, on the one hand, and the combined second and fourth angled light sources, on the other hand, detecting the presence or absence of tight at the given spot while the combined first and third light sources and the combined second and fourth light sources are separately illuminated, and determining that an edge is present if there is a difference between light detected at the spot during intervals while the combined first and third or the combined second and fourth sources are illuminated.

8. The apparatus of claim 3 wherein the first and second sheets comprise front and back sides of an envelope and the detected edge profile defines a throat of the envelope.

9. The apparatus of claim 8 further comprising envelope edge sensors detecting top, bottom and side edges of the envelope.

10. The apparatus of claim 9 wherein the controller controls the sensor carnage and sensor arrangement to determine an envelope throat profile for a first half of a side-to-side dimension of the envelope, and a remainder half of the envelope throat profile is calculated as an inverse image of the determined first half.

11. The apparatus of claim 8 further comprising:
an envelope conveying transport conveying envelopes having closed flaps;
a top edge detector detecting a top edge of the envelope where a hinge to an envelope flap is located;
a flap opening arrangement;
wherein upon detecting the top edge of the envelope, the controller causes the flap of the envelope to be opened by the flap opening arrangement and whereby, after the flap is opened, the controller begins testing for the envelope throat edge at a predetermined spot relative to a detected position of the top edge.

12. A method for detecting a profile of an edge of a first sheet overlapping on top of a second sheet, the method comprising:
testing a plurality of spots on a plane of the first and second sheets in order to determine which spots include the edge and to determine the profile of the edge based on locations of the spots detected to include the edge, the step of testing further comprising the steps of:
casting a first angled light at a spot on a plane of the first and second sheets;
casting a second angled light at the spot on the plane of the first and second sheets, the second angled light positioned opposite the first angled light;
sequentially illuminating a given spot with the first and second angled lights:
detecting the presence or absence of light at the given spot while the each of the lights are separately illuminated; and
determining that an edge is present if there is a difference between light detected at the spot while the first or second lights are illuminated;
upon detecting the presence or absence of the edge at the given spot, storing the locations of spots that include the edge;
moving the lights to a plurality of spots and repeating the testing step to determine what spots includes the edge; and
determining the edge profile based on the locations of spots including the edge.

13. The method of claim 12 including the step of arranging the first and second lights along an X axis in the plane above the first and second sheets and wherein the opposing first and second lights are used to detect whether the given spot includes an edge having a directional component in a Y axis, perpendicular to the X axis.

14. The method of claim 13 further comprising the step of arranging third and fourth angled lights operable to cast light at the spot on the plane of the first and second sheets, the third and fourth angled lights being positioned opposite each other along the Y axis, wherein the opposing third and fourth lights are used to detect whether the given spot includes an edge having a directional component in the X axis.

15. The method of claim 14 wherein the step of testing further includes sequentially illuminating a given spot with the third and fourth angled lights, detecting the presence or absence of light at the given spot while the third and fourth lights are separately illuminated, and determining that the edge is present if there is a difference between light detected at the spot while the third or fourth sources are illuminated.

16. The method of claim 14 wherein the step of testing further includes testing spots for a diagonal component of the edge by sequentially illuminating a given spot with the combined first and third angled lights, on the one hand, and the combined second and fourth angled lights, on the other hand, detecting the presence or absence of light at the given spot while the combined first and third lights and the combined second and fourth lights are separately illuminated, and determining that an edge is present if there is a difference between light detected at the spot during intervals while the combined first and third or the combined second and fourth sources are illuminated.

17. The method of claim 12 wherein the first and second sheets comprise front and back sides of an envelope and the detected edge profile defines a throat of the envelope.

18. The method of claim 17 further comprising a step of detecting top, bottom and side edges of the envelope.

19. The method of claim 18 further comprising the step of determining an envelope throat profile for a first half of a side-to-side dimension of the envelope, and for a remainder half of the envelope throat profile calculating the profile as an inverse image of the determined first half.

20. The apparatus of claim 17 further comprising the steps of:
conveying envelopes having closed flaps;
detecting a top edge of the envelope where a hinge to an envelope flap is located;
wherein upon detecting the top edge of the envelope, opening the flap of the envelope, and, after the flap is opened, beginning testing for the envelope throat edge at a predetermined spot relative to a detected position of the top edge.

* * * * *